UNITED STATES PATENT OFFICE.

FREDRICK REIMERS, OF OTTUMWA, IOWA.

MANUFACTURE OF ARTIFICIAL STONE AND MARBLE.

SPECIFICATION forming part of Letters Patent No. 268,535, dated December 5, 1882.

Application filed September 21, 1882. (No specimens.)

*To all whom it may concern:*

Be it known that I, FREDRICK REIMERS, a citizen of the United States, residing at Ottumwa, in the county of Wapello and State of Iowa, have invented an Improvement in the Manufacture of Artificial Stone and Marble; and I hereby declare the following to be a full, clear, and exact description thereof.

My invention relates to an improvement in the manufacture of artificial stone and marble, whereby a beautiful imitation of natural stone or marble can be produced at a small cost, possessing the necessary strength, hardness, and durability to adapt it for use as a building material in any climate, and for a variety of other purposes; and my invention consists in a composition formed of certain ingredients combined and chemically treated in such a manner as to produce a hard crystallized and carbonized substance which is impervious to water, and will successfully resist the action of frost and heat, as hereinafter set forth.

In carrying my invention into effect I take a suitable vessel and place therein forty-six gallons of water, and add thereto one pound of pulverized black-lead, one quart of silicate paint, (a natural liquid paint found in the mountains of Wales, and commercially known as "petrified liquid,") two quarts of strong lime-water, one-half pound of carbonate of soda, and one-half pound of borax. The whole is then thoroughly mixed and incorporated together by stirring until the soluble ingredients have been dissolved.

To make artificial stone for buildings and other purposes, I mix thoroughly, in a dry state, one part of cement (preferably Alsen & Sons' German cement) and five parts of clean sharp sand or gravel, more or less, and then dampen this mixture with a sufficient quantity of the above-described chemical solution, after which it is tamped or pressed into molds of any desired form or shape in the ordinary manner.

To manufacture artificial marble I take a suitable quantity of the above-described chemical solution and add thereto Keene's cement, which should be mixed with white sand or marble-dust, and thoroughly stir and incorporate the whole together until the mass assumes the consistence of a thick paste, when it is placed in suitable molds to give it the desired shape and compressed, after which it is allowed to remain for about six hours, or until hard and dry, when, after removal, it can be polished in the same manner as natural marble.

The above-described composition may be made of any color desired by the addition of the necessary pigment, and colored or variegated marble may be imitated by the employment of different pigments or colors, which are added to the paste and mingled or manipulated in a well-known manner to produce the desired imitation of the veins or figures of natural marble, the blocks or other articles made of this material presenting, when finished, a beautiful appearance, and bearing a perfect resemblance to natural marble.

The black-lead, which contains ninety-five per cent. of carbon, when used as above, produces a gas which is retained by the lime, causing the stone or marble to become carbonized, and at the same time allowing the cement the natural time to set without impairing the cohesion of the particles.

The chemical solution above described produces a strong adhesion of the particles, and causes the entire mass to become crystallized, solidified, and hardened to such an extent that it will be impervious to air, will effectually repel water, and withstand, without injury, the action of frost, fire, or other disintegrating or climatic influences.

Artificial stone and marble made as above described may be employed to great advantage for building-blocks, monuments and other cemetery work, sidewalks, sewer-pipes, well-tubing, mantel-pieces, and generally for the interior and exterior decoration of buildings, flooring, coating of inner and outer walls of buildings, slabs for tables, and other articles of furniture, and for an infinite variety of other articles, it being easily and cheaply molded into any desired shape, whereby an immense saving can be effected, as the great expense which is incurred in cutting natural stone or marble into the great variety of elaborate designs commonly used is entirely avoided.

What I claim as my invention, and desire to secure by Letters Patent, is—

1. An artificial stone or marble composed of sand or gravel and cement, or of Keene's cement mixed with white sand or marble-dust, united and solidified by mixing therewith a chemical solution formed of water, black-lead, petrified liquid, lime-water, carbonate of soda, and borax, substantially as and for the purpose set forth.

2. The herein-described liquid compound, consisting of water, black-lead, petrified liquid, lime-water, carbonate of soda, and borax, substantially in the proportions named, for the purpose of producing the crystallization and carbonization of the artificial stone or marble, as described.

Witness my hand this 15th day of September, A. D. 1882.

FREDRICK REIMERS.

In presence of—
I. S. MOORE,
JOHN L. MOORE.